Sept. 10, 1940. W. O. SCHULTZ ET AL Re. 21,562

REPEATING FUSE CONSTRUCTION

Original Filed June 26, 1933 3 Sheets-Sheet 1

INVENTORS
William O. Schultz
Alwin G. Steinmayer
By Andrew R. Woodfolk
ATTORNEY

Sept. 10, 1940. W. O. SCHULTZ ET AL Re. 21,562

REPEATING FUSE CONSTRUCTION

Original Filed June 26, 1933 3 Sheets-Sheet 2

INVENTORS
William O. Schultz
Alwin G. Steinmayer
By Arthur P. Woodyard
ATTORNEY

REPEATING FUSE CONSTRUCTION

Original Filed June 26, 1933 3 Sheets-Sheet 3

INVENTORS
William O. Schultz
Alvin A. Steinmayer
By Arthur R. Woolpert
ATTORNEY

Reissued Sept. 10, 1940 Re. 21,562

UNITED STATES PATENT OFFICE 21,562

REPEATING FUSE CONSTRUCTION

William O. Schultz, South Milwaukee, and Alwin G. Steinmayer, Milwaukee, Wis., assignors to Line Material Company, South Milwaukee, Wis., a corporation of Delaware Original No. 1,991,064, dated February 12, 1935, Serial No. 677,654, June 26, 1933. Application for reissue January 15, 1937, Serial No. 120,692

27 Claims. (Cl. 200—126)

This invention relates to a repeating fuse construction and is particularly directed to a construction in which a device is provided which recloses the circuit after the blowing of a fuse and connects a fresh or reserve fuse in the circuit, such device being capable of repeating as many times as the device is designed for.

The advantage of this automatic repeating fuse construction is that the device lends itself to transmission service and customer's substation service. Frequently in these services short-circuits occur due to any one of many causes such as a tree falling across a pair of lines, a pair of lines being whipped together by a wind, a flashover, a temporary ground, or the branch of a tree which in a violent wind may be blown against the line. Under these and similar conditions it frequently happens that the trouble is only temporary and that it either ceases of itself or the fault is burned out almost immediately.

This invention is designed to provide a device which will take care of conditions such as outlined above, which will electrically disconnect the blown fuse from the line, and after a predetermined brief interval immediately connect a reserve or fresh fuse in the line, such device providing for the successive operation of as many fuses as the device is equipped to handle, and to provide a device of this type in which the time delay interval is automatically secured from the inherent characteristics of the device itself without requiring any auxiliary timing mechanism.

Also in a device of this type it is obviously desirable to provide for the re-fusing of the blown fuse while the service is still maintained through one of the auxiliary fuses.

This invention provides for the renewal of a blown fuse without interrupting the service, and objects of this invention are to provide a construction which permits the ready removal and re-fusing of the blown fuse, which permits the ready restoring of such re-fused fuse, and the automatic disconnecting of the next adjacent auxiliary or reserve fuse without at any time interrupting the circuit during this restoring operation.

One of the primary objects of this invention is to provide a construction in which the fuses are all mechanically in place initially, in which no fuse has to be first mechanically moved into place before it is ready to operate upon the blowing of a preceding or first fuse, in which the auxiliary or reserve fuses, although mechanically in place, are nevertheless automatically electrically connected in service in succession as the preceding fuse or fuses blow.

Further objects are to provide a construction in which the device is eminently adapted for high voltage lines, in which each fuse as it blows drops downwardly and swings clear of the upper contact to thereby provide maximum spacing at the open portion of the circuit, and which nevertheless is rugged in construction, is simple to make, and is simple to install and is very easy to renew.

Further objects are to provide a construction in which the blown fuse or fuses may be readily removed by a switch hook or switch stick and may be readily replaced by such switch stick and again placed in service without requiring handling of any high tension part by the operator.

Further objects are to provide an automatic device in which the free falling of the blown fuse automatically closes a switch to establish a circuit through the next reserve fuse, which locks the switch in closed position, in which the falling cartridge may be removed and the continuity of service maintained, in which the refused cartridge when rocked to closed position automatically restores itself, that is to say, restores the service through the first fuse, unlocking the switch and disconnecting the next reserve fuse, the restored fuse, however, establishing its own circuit prior to the interruption of the circuit through the next adjacent reserve fuse.

In general this invention has the same objects for each individual fuse structure as those disclosed in our copending application Serial No. 622,292 for Combined switch and fuse, filed July 13, 1932.

An embodiment of the invention is shown in the accompanying drawings, in which.

Figure 1:
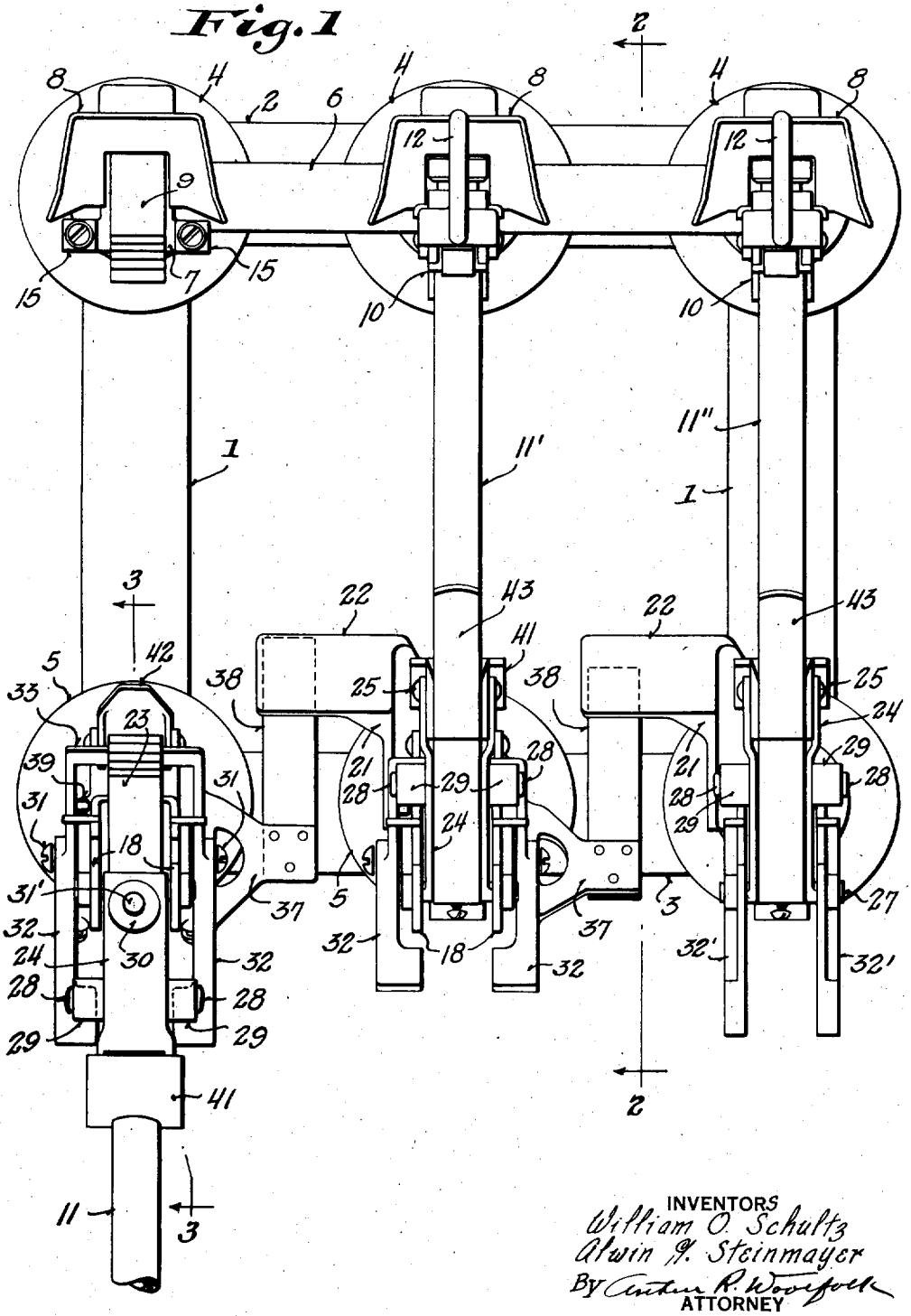
Figure 1 is an elevation of the structure.

Referring to the drawings, it will be seen that the fuse is carried by a base of any suitable type, such, for example, as the frame metal base, which may consist of upright channel or angle members 1, and upper and lower angle or channel members 2 and 3.

A plurality of upper insulators 4 extend outwardly from the upper member 2 and a plurality of lower insulators 5 extend outwardly from the lower member 3, though it is to be distinctly understood that any suitable arrangement of base and insulator supports can be used without departing from the spirit of the invention. For instance, it is obvious that either a single insulator, two insulators, or any number of insulators could be used to support the bar 6, hereinafter described.

The upper insulators 4 carry a transversely extending connecting bar 6 to which a plurality of upper contact members 7 are secured. These upper contact members 7 are all connected and each is preferably provided with a latch-like sleet hood 8, as described in our copending application. Preferably each of the contacts 7 is provided with an upper copper or bronze brush 9 which resiliently bears against the flat face of the upper contact 10 of the fuse 11. This sleet hood or locking member may be released by pulling downwardly upon the switch hook ring or operating member 12, such member being provided with a forked rear portion equipped with arms 13 which are located below the latching member 8 and serve to raise the latching member, thereby permitting the upper end or pin 14 of the upper contact 10 of the fuse to clear the latching member and thus permitting the opening of the device if it is desired to manually open it. This specific construction, however, is described in great detail in our copending application.

One of the upper contacts 7 is provided with a leadin terminal 15. Each of the lower insulators 5 carries a supporting bracket 16 to which is bolted a member 17 provided with a lower hook-like bottom support 18. A terminal carrying bracket 19 is bolted below the memer 17, see Figure 3, and is provided with a lead receiving terminal 20.

Figure 2:
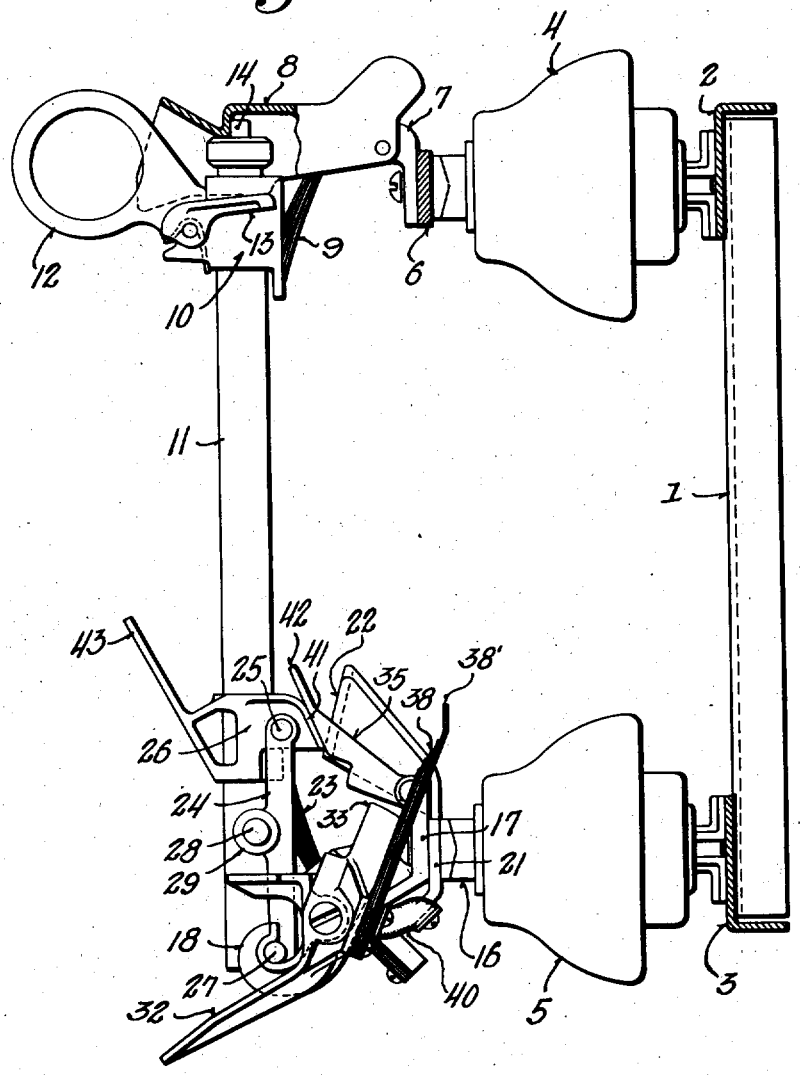
Figure 2 is a sectional view on the line 2—2 of Figure 1, with parts broken away, with the element 22 of the right hand fuse unit, as viewed in Figure 1, omitted for the sake of clearness.

For each of the succeeding fuses a contact bracket 21 replaces the bracket 19 and each of these contact brackets is provided with a contact arm 22 projecting laterally towards the next adjacent fuse, see Figures 1 and 2. The bracket 19 and each of the brackets 21 is provided with spring contact brushes, such as copper or bronze brushes, as indicated by the reference character 23, see Figure 3. These brushes bear against a normally substantially vertical lever 24, see Figure 2, which is pivoted at 25 upon an intermediate member 26 carried by the fuse tube adjacent its lower end. Each of the levers 24 is provided with outwardly projecting trunnions 27 which are removably received within the hook supports 18. Further, each of these levers 24 is provided with outwardly projecting intermediate pins 28 which carry rubber bumpers or stops 29 for a purpose hereinafter to appear. This construction is most clearly shown in Figures 2 and 3.

Figures 3, 4:
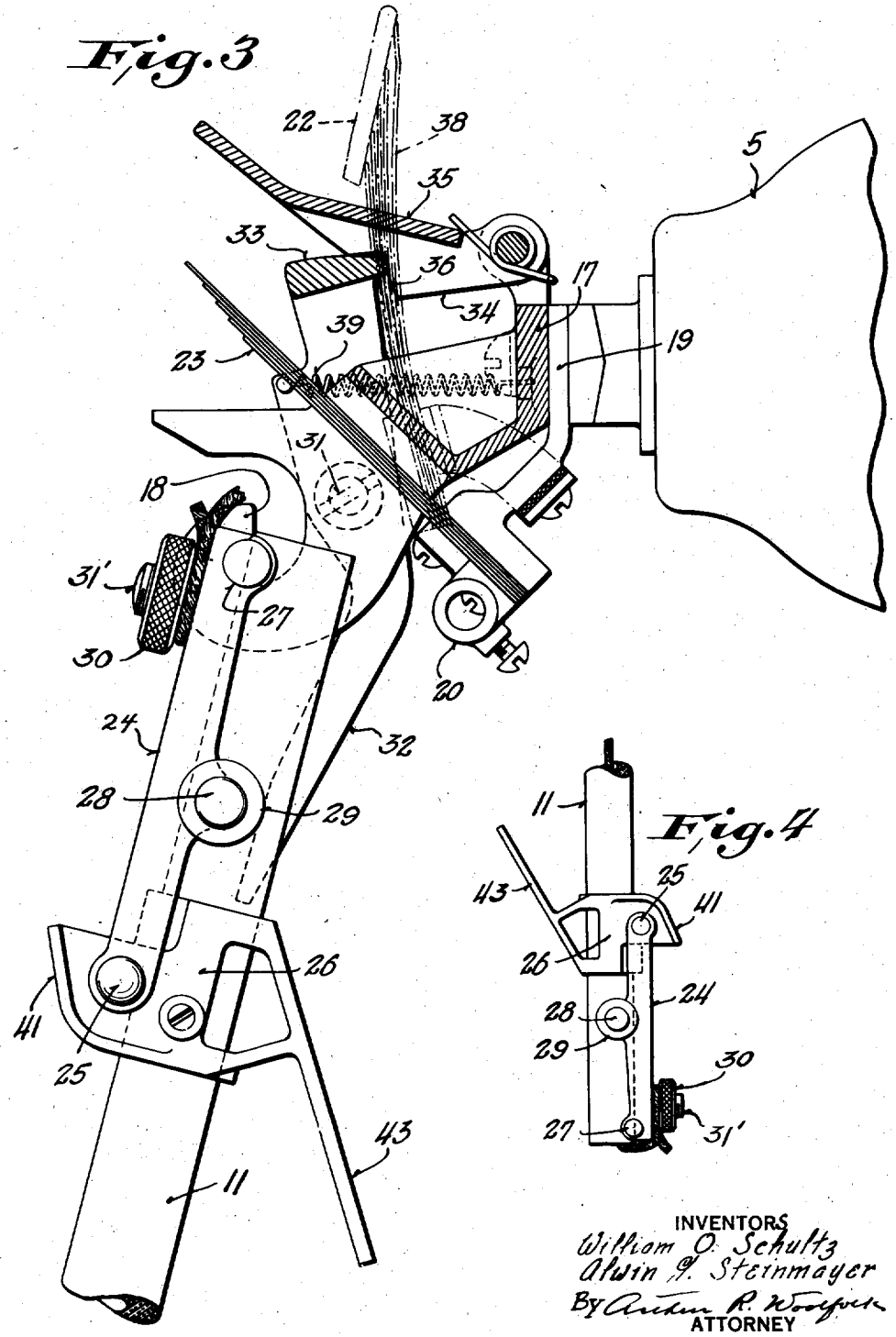
Figure 3 is an enlarged sectional view on the line 3—3 of Figure 1.
Figure 4 is a fragmentary detail of the lower portion of one of the fuses, such fuse being removed from the remainder of the structure.

From Figure 4 it will be seen that the fuse link which extends downwardly from the upper contact has its leader passing through the lower end of the fuse tube 11 and is clamped to the lever 24 by means of a nut 30 carried by a threaded stud 31' which latter is integral or rigid with the lever 24. The slight turning motion of the nut while turning it in place, serves to draw the link taut as the link is wrapped around the stud. However, when the fuse link blows, the lever 24 allows the fuse tube to swing outwardly and drop downwardly, thus allowing the upper pin 14 of the upper contact, see Figure 2, to clear the latch or sleet hood 8, as described in greater detail in our copending application. The fuse tube then swings outwardly into the position shown in Figure 3.

A rocking bracket or frame is pivotally carried by each of the lower terminal members or contact members 17, as shown in Figure 3, and is pivoted thereto as indicated by the reference character 31. This frame consists of a pair of spaced arms 32 located on opposite sides of the fuse tube and adapted to be struck by the bumpers 29 when the fuse swings to its lowermost position, as shown in Figure 3. The upper end of this rocking frame is provided with a transverse portion 33 which is located below the face 34 of a spring pressed latch 35. However, when the rocking frame is rocked outwardly into the position shown in Figure 3, the transverse portion 33 bears against a shoulder 36 formed on the latch 35 and thus locks the frame in the position shown in Figure 3.

The rocking frame is provided with an outwardly projecting arm 37, see Figure 1, which carries spring contact brushes 38 which form a switch member and which when the frame is in the position shown in Figure 3, engages the underside of the member 22 and thus electrically connects the lower contact of the next adjacent fuse with the lower contact of the blown fuse. This construction is repeated for the intermediate fuse so that when the intermediate fuse 11' blows, the outer fuse 11'' will then be electrically connected in circuit. Obviously as many of these fuse units can be employed as desired. The end fuse 11'' need not be provided with the outwardly projecting arm 37 on its rocking frame 32'.

It is to be noted that the rocking frame 32 is urged inwardly by means of the spring 39, see Figure 3, so that the transverse portion 33 is firmly held on the shoulder 36 of the spring pressed latch 35. When the parts are locked in this position, the switch arm or contact brushes 38 are held in firm engagement with the contact plate 22 of the next adjacent fuse when the first fuse has blown, as shown in Figures 1 and 3.

It is preferable to provide a flexible connector as indicated by the reference character 40, see Figure 2, which joins the switch arm or contact brush 38 with the bracket 21 or with some other portion connected with the lower terminal of its fuse unit. Also it is preferable to provide an arcing contact 38', see Figure 2, for the spring brushes or switch arm 38.

It is to be noted that the member 26 is provided with a rearwardly projecting face portion 41 which engages the upwardly projecting finger 42 of the spring pressed latch 35 so as to release the latch when the blown fuse, after having been re-fused, is rocked into operative position, as shown in Figure 2, or as shown in the last two fuses of Figure 1.

Further it is preferable to provide the member 26 with an outwardly projecting arm 43 which is adapted to be engaged by a switch stick so that the fuse may be bodily lifted by the switch stick from the lower hook-shaped members 18 and may be replaced and thereafter rocked into position by means of the switch stick through the medium of the upper ring 12, for instance.

In the operation of the device it will be seen that all of the fuses are mechanically in place. If an overload occurs, the first fuse will blow and the fuse tube 11 will first drop downwardly, due to the rocking motion of the then released lever 24, and thereafter rock outwardly and downwardly to its final bottom position, as shown in the left hand side of Figure 1 and in Figure 3.

Until the fuse has completed its rocking motion, the remaining fuses are electrically out of circuit, though mechanically in position. As the fuse completes its downward swing, the bumpers 29 or the pins 28, if the bumpers are omitted, engage the forked arms of the frame 32 and rock this frame into the position shown in Figure 3, the latch 35 snapping into place. As the frame 32 is rocked quickly into the position shown in Figure 3, which corresponds to the left hand unit of Figure 1, it will be seen that the contact brushes or switch member 38 engages the underside of the contact plate 22 of the next fuse and thus electrically connects the next fuse in the circuit.

If the fault has been cleared, obviously the next fuse does not blow but maintains the service. However, if the fault has not cleared, the next fuse 11′ operates as described for the first fuse 11 and successively connects the next fuse 11″ in the circuit.

It frequently happens, as stated previously, that the fault is only a temporary one and that after the blowing of one fuse, the fault is gone, as, for instance, when a branch is suddenly violently blown in contact with a line, or when a flashover occurs, or any other of this type of temporary short-circuit condition obtains.

A certain interval is required for the free falling of the fuse and this time delay or interval, which is inherent in the construction of the apparatus itself and not dependent upon any auxiliary timing mechanism, insures a certain predetermined lapse of time before the next successive fuse is electrically connected into the circuit.

Further it is to be noted particularly that after the blown fuse has been re-fused and is being rocked into place, that before the member 26 engages the finger 42 of the spring pressed latch 35, that the upper contact 10 has engaged the extended unflexed contact brush 9. Continued motion of the fuse towards closed position releases the latch 35 and allows the frame 32 to be snapped back or be drawn back by the spring 39, see Figure 3, into its initial position, thereby rocking the switch member or brush 38 from engagement with the plate 22 and opening the circuit through the next or reserve fuse. During a brief instant just prior to the final closing motion of the fuse, it is obvious that two of the fuses temporarily carry the current in parallel and thus no interruption of the service is occasioned during the reclosing of the fuse.

It will be seen that a novel and very rugged form of automatic or repeating fuse mechanism has been provided by this invention which does not require any cocking or setting of the mechanism, which does not require the mechanical throwing or rocking of the fuse into position, but which has the reserve fuses already in their mechanical position and electrically connects in succession the reserve fuses as the next preceding fuse blows.

It will be seen further that no auxiliary timing mechanism is required for this construction but that the construction is wholly automatic both in resetting and opening the circuit through the next adjacent reserve fuse and in establishing this circuit when the preceding fuse blows.

It will be seen further that the construction is very simple, that it is easy to operate, and that it may be operated by means of a switch stick or fuse stick, thereby guarding against damage to the lineman or operator.

Although this invention has been described in considerable detail, it is to be understood that such description is intended as illustrative rather than limiting, as the inventon may be variously embodied and is to be interpreted as claimed.

We claim:

1. A repeating fuse construction comprising a first fuse unit and a second fuse unit, a fuse link in each unit, an electric line normally connected through said first fuse unit, both said units being normally mechanically held in operative position, said first fuse unit being biased towards motion away from its normal position, means for releasing said first fuse unit upon blowing of the fuse link of said first fuse unit, said first fuse unit being movable to inoperative position upon blowing of the link of said first unit, and a switch directly moved by the movement of said first fuse unit for electrically connecting said second fuse unit in said electric line, said switch normally occupying open circuit position and being moved by the movement of the first fuse unit.

2. A repeating fuse construction comprising a first fuse unit and a second fuse unit, a fuse link in each unit, an electric line normally connected through said first fuse unit, both said units being normally mechanically held in operative position, said first fuse unit being biased towards motion away from its normal position, means for releasing said first fuse unit upon blowing of the fuse link of said first fuse unit, said first fuse unit being movable to inoperative position upon blowing of the link of said first unit, and a switch directly moved by the movement of said first fuse unit for electrically connecting said second fuse unit in said electric line after said first fuse unit has moved to a predetermined position, said switch normally occupying open circuit position and being moved by the movement of the first fuse unit, whereby a predetermined time delay is secured between the operation of said first fuse unit and the reclosing of the circuit through said second fuse unit.

3. An automatic repeating fuse construction comprising a first fuse unit and a second fuse unit, an electric line normally connected through said first fuse unit, both said fuse units being normally mechanically held in operative position, means for releasing said first fuse unit upon blowing of said first fuse unit, means actuated by the movement of said first fuse unit for connecting said electrical line through said second fuse unit, and locking means for positively locking said second mentioned means after said first mentioned means has operated, whereby said first fuse unit may be removed for re-fusing without disturbing the circuit through said second fuse unit.

4. An automatic repeating fuse construction comprising a first fuse unit and a second fuse unit, an electric line normally connected through said first fuse unit, both said fuse units being normally mechanically held in operative position, means for releasing said first fuse unit upon blowing of said first fuse unit, means actuated by the movement of said first fuse unit for connecting said electrical line through said second fuse unit, and locking means for locking said second mentioned means after said first mentioned means has operated, said locking means being released by said first fuse unit when said first fuse unit is moved back into operative position.

5. An automatic repeating fuse construction comprising a first fuse unit and a second fuse unit, an electric line normally connected through said first fuse unit, both said fuse units being normally mechanically held in operative position, means for releasing said first fuse unit upon blowing of said first fuse unit, switch means actuated by the movement of said first fuse unit for connecting said line through said second fuse unit, and a spring pressed latch for positively locking said switch means in closed position.

6. An automatic repeating fuse construction comprising a first fuse unit and a second fuse unit, an electric line normally connected through said first fuse unit, both said fuse units being normally mechanically held in operative position, means for releasing said first fuse unit upon blowing of said first fuse unit, switch means actuated by the movement of said first fuse unit for connecting said line through said second fuse unit, and a spring pressed latch for positively locking said switch means in closed position, said first fuse unit being freely mechanically removable when in inoperative position without disturbing said switch means.

7. An automatic repeating fuse construction comprising a first fuse unit and a second fuse unit, an electric line normally connected through said first fuse unit, both said fuse units being normally mechanically held in operative position, means for releasing said first fuse unit upon blowing of said first fuse unit, switch means actuated by the movement of said first fuse unit for connecting said line through said second fuse unit, and a spring pressed latch for locking said switch means in closed position, said first fuse unit being freely mechanically removable when in inoperative position without disturbing said switch means, said latch being released by said first fuse unit when said first fuse unit is moved back to operative position.

8. An automatic repeating fuse construction comprising a first fuse unit and a second fuse unit, an electric line normally connected through said first fuse unit, both said fuse units being normally mechanically held in operative position, means for releasing said first fuse unit upon blowing of said first fuse unit, switch means permanently biased towards open position and actuated by the movement of said first fuse unit for connecting said line through said second fuse unit, and a spring pressed latch for locking said switch means in closed position.

9. An automatic repeating fuse construction comprising a first fuse unit and a second fuse unit, an electric line normally connected through said first fuse unit, both said fuse units being normally mechanically held in operative position, means for releasing said first fuse unit upon blowing of said first fuse unit, switch means actuated by the movement of said first fuse unit for connecting said line through said second fuse unit, and a spring pressed latch for locking said switch means in closed position, open supporting means for pivotally supporting said first fuse unit, said first fuse unit being freely mechanically removable from its supporting means when in inoperative position without disturbing said switch means.

10. An automatic repeating fuse construction comprising a first fuse unit and a second fuse unit, an electric line normally connected through said first fuse unit, both said fuse units being normally mechanically held in operative position, means for releasing said first fuse unit upon blowing of said first fuse unit, switch means biased towards open position and actuated by the movement of said first fuse unit for connecting said line through said second fuse unit, and a spring pressed latch for locking said switch means in closed position, said first fuse unit being freely mechanically removable when in inoperative position without disturbing said switch means, said latch being released by said first fuse unit when said first fuse unit is moved back to operative position.

11. A repeating fuse construction comprising a plurality of drop-out fuse units, each unit comprising a body portion having stationary contacts, a fuse tube having spaced contacts normally engaging said stationary contacts and movable outwardly, a fuse link for each fuse tube normally restraining the outward motion of the fuse tube, and switch carried by each preceding fuse unit and closable directly by the force due to the fall of the corresponding fuse tube for connecting the next succeeding fuse unit in circuit.

12. A repeating fuse construction comprising a plurality of drop-out fuse units, each unit comprising a body portion having stationary contacts, a fuse tube having spaced contacts normally engaging said stationary contacts and movable outwardly, a fuse link for each fuse tube normally restraining the outward motion of the fuse tube, a switch carried by each preceding fuse unit and closable directly by the force due to the fall of the corresponding fuse tube for connecting the next succeeding fuse unit in circuit, and means urging each switch towards open position.

13. In a repeating fuse construction comprising a plurality of pivotally mounted fuse cartridges each having a latch holding them in circuit closing position and controlled by fuse links in the cartridges, a plurality of switches normally in open circuit position and adapted to connect certain of said fuse cartridges in the circuit, said switches having switch operating arms extending into the path of movement of said fuse cartridges when the latter are moving to open circuit position, whereby the switches are moved to closed circuit position solely by said fuse cartridges.

14. A repeating fuse construction comprising a first fuse unit and a second fuse unit, said fuse units each including a fuse tube and being of the drop-out type and each having a lever pivotally supporting the corresponding fuse tube in operative position and releasing the fuse tube and allowing the fuse tube to drop outwardly to inoperative position when said lever rocks away from the fuse tube, a fuse link in each fuse tube normally holding the corresponding lever of the fuse unit against motion, and a switch actuated by the outward dropping movement of said first fuse tube for connecting said second fuse unit in circuit upon blowing of said first fuse unit.

15. A repeating circuit interrupting device including a first cutout and a second cutout, said first cutout having a pivotally mounted arcing tube with an expulsible conductor therein, movable latch means to engage and hold the tube in closed circuit position, means to release the tube from the latch by the bodily movement of said tube without the necessity of motion of said latch means, and a circuit closing switch controlled by the first cutout for closing an electrical circuit through the second cutout.

16. A repeating circuit interrupting device including a first cutout and a second cutout, said first cutout having an arcing tube which is movable between closed circuit and open circuit positions, an expulsible conductor within said tube, means to latch the tube in closed circuit position by an approximately lateral motion of the tube, means to release the tube from closed circuit position by approximately longitudinal motion of the tube, and a circuit closing switch controlled by the first cutout for closing an electrical circuit through the second cutout.

17. A repeating circuit interrupting device including a first cutout and a second cutout, said first cutout comprising an arcing tube, a conductor in said tube, movable latching means at each end of the tube cooperating to hold the tube in closed position under normal circuit conditions and to release the tube under overload conditions in the circuit, and a circuit closing switch controlled by the first cutout for closing an electrical circuit through the second cutout.

18. A repeating circuit interrupting device including a first cutout and a second cutout, said first cutout comprising an arcing tube pivotally mounted and movable between closed circuit and open circuit positions, a conductor within the tube, latch means at each end of the tube which means are operable to hold the tube in closed circuit position under normal circuit conditions and to release the tube under overload conditions in the circuit, and a circuit closing switch controlled by the first cutout for closing an electrical circuit through the second circuit.

19. A repeating breaker switch comprising a plurality of breaker switch units each comprising a pair of spaced stationary contacts, a pivotally mounted insulating tube having spaced contact members engaging the stationary contacts, a flexible conductor in said tube electrically connecting said contact members, said tube being closed at its upper end and open at its lower end, latch means holding said tube with said contact members in engagement with said stationary contacts, and means operable on the occurrence of an overload to release said latch means, in combination with switch means normally held in open circuit position and releasable when the contact members and stationary contacts are disengaged to close an electrical circuit through another of said units.

20. A repeating cut-out construction comprising a first cut-out and a second cut-out, an electric line normally connected through said first cut-out, said first cut-out being mechanically held in operative position and being bodily movable to inoperative position out of the circuit of said electric line, current responsive means for releasing said first cut-out, a support, a lever pivoted on said support and pivotally connected to said first cut-out for normally supporting said first cut-out in operative position, and a switch operative on movement of said first cut-out for connecting the electric line through said second cut-out.

21. A repeating fuse construction comprising a first fuse unit and a second fuse unit, said first fuse unit being mechanically held in operative position and being movable to inoperative position, an electric line, said first fuse unit when in operative position being in the circuit of said electric line and when in inoperative position being out of the circuit of said electric line, a fuse link in said first fuse unit normally restraining said first fuse unit from motion from operative to inoperative position, a lever pivoted to said first fuse unit, a support pivotally supporting said lever at a point spaced from the pivot point of said lever with said first fuse unit, and a switch operative on movement of said first fuse unit for connecting said electric line through said second fuse unit.

22. A repeating fuse construction comprising a first fuse unit and a second fuse unit, said first fuse unit being mechanically held in operative position and being bodily movable to inoperative position, an electric line, said first fuse unit when in operative position being in the circuit of said electric line and when in inoperative position being out of the circuit of said electric line, a fuse link in said first fuse unit, a support pivotally supporting said first fuse unit from adjacent the lower end of said first fuse unit, latch means adjacent the upper end of said first fuse unit for normally holding said first fuse unit in operative position and being released when said fuse link is ruptured, said latch means including a first part carried by said support and a second part carried by said first fuse unit, said second part of said latch means being released from said first part of said latch means when said fuse link is ruptured without the necessity of motion of the first part of said latch means, and a switch operative on movement of said first fuse unit for connecting the electric line through said second fuse unit.

23. A repeating circuit interrupter comprising a pair of arcing tubes normally held in closed circuit position and pivotally supported for movement from closed circuit position to open circuit position, latching means normally holding said tubes in their respective circuit closing positions and responsive on overload in an electric circuit to release said tubes for movement to open circuit position, and current controlled means including an expulsible conductor in each of said tubes for releasing said latching means; in combination with a circuit closing switch normally held in open circuit position and including a pivotally mounted switch blade having a switch controlling member disposed in the path of movement of one of said tubes to be engaged thereby when one of said tubes is moving to open circuit position, whereby to close a circuit through the other of said tubes.

24. A repeating circuit interrupter comprising a pair of arcing tubes normally held in closed circuit position and pivotally supported for movement from closed circuit position to open circuit position, latching means normally holding said tubes in their respective circuit-closing positions and responsive on overload in an electric circuit to release said tubes for movement to open circuit position, and current controlled means including an expulsible conductor in each of said tubes for releasing said latching means; in combination with a circuit closing switch normally held in open circuit position and including a pivotally mounted switch blade having a switch controlling member disposed in the path of movement of one of said tubes to be engaged thereby when one of said tubes is moving to open circuit position, whereby to close a circuit through the other of said tubes, and spring biased means for holding said switch blade in circuit closing position after said switch controlling member has been engaged by one of said tubes.

25. A repeating fuse construction comprising a first fuse unit and a second fuse unit, a fuse link in each unit, an electric line normally connected through said first fuse unit, said first fuse unit being a drop-out fuse unit and being normally held in operative position by said fuse link and released when said fuse link is ruptured and falling to inoperative position, and means moved and actuated directly by the energy stored in said first fuse unit during the falling of the first fuse unit for placing said second fuse unit in service in said electric line.

26. A repeating fuse construction comprising a first fuse unit, a second fuse unit, and a third fuse unit, a fuse link in each fuse unit, an electric line normally connected through said first fuse unit, said first fuse unit and said second fuse unit each being a drop-out fuse unit and being normally held in operative position by the corresponding fuse link and released when the corresponding fuse link is ruptured and falling to inoperative position, means moved and actuated directly by the energy stored in said first fuse unit during the falling of the first fuse unit for placing said second fuse unit in service in said electric line, and additional means moved and actuated directly by the energy stored in said second fuse unit during the falling of the second fuse unit for placing said third fuse unit in service in said electric line.

27. In a repeating circuit interrupting device, an electric line, a first interrupter normally held in operative position in the electric line and mechanically movable to and biased towards an inoperative position out of the electric line, current responsive means for releasing said first interrupter for movement from operative to inoperative position, a second interrupter and a transfer switch for connecting said second interrupter in the electric line when said first interrupter has moved from operative position, said switch being opened when said first interrupter is moved back to operative position.

WILLIAM O. SCHULTZ.
ALWIN G. STEINMAYER.